UNITED STATES PATENT OFFICE.

FREDERICK E. BEARDSLEE, OF BROOKLYN, NEW YORK.

IMPROVEMENT IN GALVANIC BATTERIES.

Specification forming part of Letters Patent No. 130,353, dated August 13, 1872.

*To all whom it may concern:*

Be it known that I, FREDERICK E. BEARDSLEE, of the city of Brooklyn, in the county of Kings, State of New York, have invented a new and useful Improvement in the Negative Element of Galvanic Batteries, of which the following is a specification:

In all organizations of what is commonly known as galvanic batteries there are three distinct elements required, viz., positive and negative metals or substances, and some oxidizing agent or fluid. As a positive metal zinc is regarded as the best, and is the metal generally used in a great variety of oxidizing fluids or agents in connection with a great variety of negative metals or substances.

My improvement and discovery consist in the use of the metal chromium for the negative element of the battery. For this purpose alloys, such as iron, carbon, &c., may be combined or mixed with chromium to obtain form without material injury to its conducting and negative properties; or it may be combined with platinum and other like metals to give ductility, &c.; or it may be electrically deposited like platinum upon silver and other metals; or it may be imparted or fused upon the surface of other metals for the same purpose.

I have stated above that the chromium may, for the purpose of a negative element in a battery, be electro-deposited upon some other metal, *h*. Having succeeded in so depositing it as to form a thick and substantial lamina upon copper, silver, &c.; and I believe I am the first one that has ever effected such deposit of this metal, so as to be of any practical value, as an electro-plating of articles of manufacture; but I do not, in this application, intend to ask for a patent covering such electro-plating of articles of manufacture with the metal chromium, reserving such claim for a separate application, which it is my purpose to file in the Patent Office.

Chromium is one of the most extremely negative metals. It is not oxidized or acted upon by sulphuric, nitric, or muriatic acids, or dissolved by aqua regia.

I have discovered that the practical use of this metal, even when largely alloyed with iron, as the negative element of a battery, shows it to be the best substance or plate ever before used. All the hydrogen generated is quickly separated from the plate, thus at all times producing not only a perfectly uniform current, but also giving, for useful purposes, the entire electricity produced by the decomposition of the positive plate.

A battery constructed with the chromium-negative element gives off the electricity generated so long as any relic of an oxidizing agent is in contact with the plates without showing the deterioration so well known when other metals or substances are used. Changes of temperature, which so much affect all other organizations, produce no perceptible effect with the chromium-plate batteries.

What I claim is—

The combination, in the formation of galvanic batteries, of the metal chromium as the negative element therein, with any suitable substance as the positive element therein, substantially as and for the purpose described.

FREDERICK E. BEARDSLEE.

Witnesses:
CHARLES H. THOMSON,
GEO. W. BEARDSLEE.